United States Patent Office 3,173,764
Patented Mar. 16, 1965

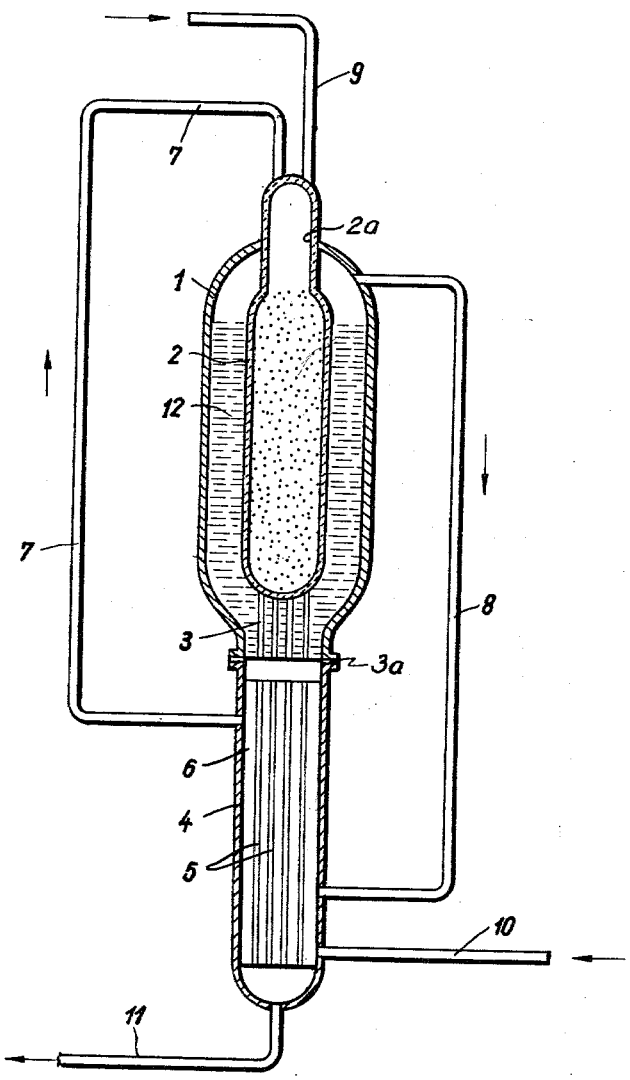

3,173,764
APPARATUS FOR THE EXOTHERMIC AND CATALYTIC REFORMING OF HYDROCARBONS
Otto Hubmann, Bad Homburg, Heinz Hiller, Bad Vilbel-Heilsberg, and Ernst Kapp, Frankfurt am Main, Germany, assignors to Metallgesellschaft Aktiengesellschaft, Frankfurt am Main, Germany
Filed May 2, 1962, Ser. No. 191,806
Claims priority, application Germany, May 6, 1961, M 48,975
5 Claims. (Cl. 23—288)

This invention is directed to an apparatus for the exothermic and catalytic reforming of hydrocarbons to produce CO and $H_2$.

The exothermic, catalytic reforming of hydrocarbons, such as in treating gases containing methane, is achieved by adding air, oxygen enriched air, or oxygen and, if necessary, water vapor in the form of steam, and/or carbon dioxide to the gas in a catalyst-filled reaction chamber. As this reaction gives up a considerable amount of heat, the reaction chamber has been enclosed in an insulated housing which could withstand the intense heat. This is also true for a simple exothermic process, as well as for the exothermic, catalytic reaction taking place under pressure. An apparatus is also known for the exothermic, catalytic reaction taking place under a pressure of several atmospheres. In such an apparatus, the reaction chamber has its inner wall lined with brick, and the chamber is enclosed by a water jacket so as to reduce the wear and tear on the insulating brick, and also to more accurately control the reforming reaction process by means of the improved conduction of the heat. The vertical reaction chamber has its lower end merged into a heat exchanger containing a plurality of tubes, with the connection between the chamber and the heat exchanger being by means of a flange coupling. This flange coupling is enclosed within the water jacket in order to be adequately cooled. However, this has the disadvantage in that the coupling is not readily accessible for repair work.

An apparatus is also known for a thermal reaction in which the reaction within the reaction chamber takes place at substantially higher temperatures and without the use of a catalyst. The reaction chamber is connected to a very large pre-cooling zone in which the cooling tubes or pipes are formed in a spiral and extend through the water jacket and around the reaction chamber. Such an apparatus is expensive to construct for operation under pressure and has the disadvantage because the cooling tubes, by reason of their form and their necessarily limited number, cause a considerable loss of pressure in the reaction gases moving through them. Also, the danger always exists that deposits will collect at the bent portions of the tubes turned away from the direction of gas flow, and such deposits are very difficult to remove.

An apparatus is also known for the catalytic reforming process in which the heat needed for carrying out the reaction is introduced by means of flue gases. However, the continuous supply of heat that is necessary for this process creates a problem concerning the apparatus in that the introduction of flue gases is complicated and requires compensation for expansion and contraction so that the length for the apparatus and flue gases flowing at various temperatures through different zones do not damage the apparatus. Moreover, it is not practical to operate such an apparatus under pressure inasmuch as very thick walls would be required for the housing and which walls would have to be heated to a high temperature in order to ensure a heat exchange between the flue gases and the reacting gases which is economical. Moreover, in order to withstand pressures at the high wall temperatures, only pipes heated from the outside could be used.

The object of this invention is to modify the structures of the prior art in order to avoid the disadvantages thereof. According to this invention, the tubes of the heat exchanger are not directly connected to the reaction chamber, but use is made of an intermediate bundle of tubes between the reaction chamber and the heat exchanger. This intermediate bundle of tubes is rigidly connected to the reaction chamber, while the connection to the heat exchanger is made through a flange coupling exterior of the water jacket in closing the reaction chamber.

The apparatus of this invention has the advantage over the prior art structures in that the reformed gases coming from the reaction chamber are pre-cooled in the bundle of intermediate tubes and before they enter the heat exchanger. Thus the temperature at the flange coupling between the intermediate bundle of tubes and the heat exchanger is lower than the temperature at the outlet end of the reaction chamber. Therefore, it is sufficient to cool but one side of the flange coupling, and it is not necessary to enclose the flange coupling within the water jacket. It suffices that the water jacket is in contact with the upper portion only of the flanged coupling. By reason of this structure, the flange coupling is easily accessible for repair work and cleaning, and it can even be worked on while the apparatus is operating.

The means by which the objects of the invention are obtained are described more fully with reference to the accompanying diagrammatic drawing which is a vertical cross-sectional view through the apparatus.

The closed cylindrical water jacket 1 surrounds a cylindrical reaction chamber 2. A bundle of intermediate tubes 3 extends from the outlet end of the reaction chamber to the water jacket and is rigidly connected to the reaction chamber and the water jacket. The tube bundle 3 therefore is positioned within the water jacket space.

It is preferred that both the jacket 1 and the reaction chamber 2, as well as the tube bundle 3, be constructed to withstand pressure. Thus different pressures could prevail in the reaction chamber in which the reforming of gases takes place, and within the space 12 comprising the cooling water space within jacket 1. Reaction chamber 2 can have its inner wall lined with high temperature resistant ceramic fire brick 2a. Reaction chamber 2 is at least partially filled with a nickel catalyst, which is usually deposited on a carrier, and which provides the means for the reforming of the gases. Below jacket 1 and beneath intermediate tube bundle 3 is a flange coupling 3a joining jacket 1 to a heat exchanger 4 containing tubes 5. These tubes 5 communicate with and constitute the extension of the bundle of tubes 3. Therefore, the gases coming from the reaction chamber 2 can flow through the intermediate tube bundle 3 and the tubes 5 without any change in direction. Thus the gases reacted in chamber 2 have a temperature of from 800 to 1000° C., and leave the tube bundle 3 at a temperature of from about 700 to 800° C., at which temperature the gases immediately enter tubes 5.

The space 6 surrounding tubes 5 of heat exchanger 4 is used to heat the gases being introduced into reaction chamber 2. Also, this space serves to additionally heat the steam that is created in and comes from the water jacket space 12 by means of pipe 8, as well as to preheat the raw hydrocarbon gas introduced into heat exchanger 4 by pipe 10. However, it is also possible to introduce steam through pipe 10. These gases are preheated as they flow through heat exchanger 4 and they leave the upper portion of the space 6 through pipe 7 by means of which they are fed into the top of the reaction chamber 2. At the same time, the reaction chamber is furnished, through pipe 9, with the oxygen, or the gases containing oxygen, necessary for the exothermic reforming process, and these gases can also be preheated. The treating gases are cooled to approximately 300 to 400° in heat exchanger 4 and then are taken off through pipe 11 for further processing. By this means, a temperature is obtained which is well suited for the later conversion of the carbon monoxide. The apparatus of this invention combines into one construction unit the reaction chamber 2 with the intermediate tube bundle 3 and the water jacket 1. This has the following advantages.

It is practically impossible to overheat the wall of reaction chamber 2. The reacted gases which have a temperature of from about 800 to 1000° C. before they leave chamber 2 enter intermediate tube bundle 3 without any interruption to the process or loss of heat, and this results in an improved use of the heat content of these gases. Brick lined pipes, a highly heat resistant flange coupling and expansion joints, all of which need much maintenance, are avoided in this invention. Formation of soot within the heat exchanger during the cooling of the hot treating gases is avoided, by reason of the intermediate tube bundle 3, even under conditions when the gases are processed with a less amount of steam.

A further advantage of this invention lies in that the overheating temperature is lower than in prior apparatus so that pipe 7 can have a simpler construction. Also, the pre-cooling of the hot treated gases creates additional steam so that only a relatively small amount of additional make-up steam is required.

It is preferred that the apparatus be enclosed by an insulating wall. The apparatus is especially suitable for the exothermic reforming of hydrocarbons at pressures of from about 3 to 30 atmospheres or more and can be used for the reforming of methane, or the reforming of gases containing methane and even higher homologs up to about 5 C-atoms, such as prevail in connection with natural gas, cracked gas, refinery gas, synthesis waste gas, blue water gas or the like, whose reforming into gases containing carbon monoxide and hydrogen is well known.

Having now described the means by which the objects of the invention are obtained, we claim:

1. In an apparatus for the exothermic catalytic reforming of hydrocarbons under pressure, said apparatus having a cylindrical reactor enclosed within a steam generating cooling jacket, and a heat exchanger containing tubes for receiving the gas output from said reactor, the improvement comprising a bundle having tubes spaced from each other for cooling liquid circulation therebetween and providing communication between the interior of said reactor and through the outer wall of said cooling jacket for partially cooling the gases flowing through the bundle of tubes before the gases pass outwardly through said jacket to said heat exchanger, said bundle of tubes being rigidly secured to said reactor and said jacket, and coupling means exteriorly of said jacket for communicatively joining each tube in said bundle of tubes to the corresponding tube in said heat exchanger.

2. In an apparatus as in claim 1, said reactor and cooling jacket each being a pressure resisting vessel.

3. In an apparatus as in claim 2, further comprising a lining of high temperature resistant ceramic fire brick on the wall of said reactor.

4. In an apparatus as in claim 3, further comprising a raw gas inlet pipe connected to the cool end of said exchanger, and an outlet pipe extending from the hot end of said exchanger to the inlet end of said reactor for preheating raw gas introduced into said reactor.

5. In an apparatus as in claim 4, further comprising another pipe extending from said water jacket to said exchanger for conveying the steam generated in said jacket to said heat exchanger.

References Cited in the file of this patent
UNITED STATES PATENTS

| 2,406,908 | Schideler et al. | Sept. 3, 1946 |
| 2,532,756 | Brunjes et al. | Dec. 5, 1950 |
| 2,618,534 | Mrstik | Nov. 18, 1952 |

FOREIGN PATENTS

| 533,877 | Great Britain | Feb. 21, 1941 |

OTHER REFERENCES

Hubmann: German printed application M 28,563 IVc/26a, Dec. 20, 1956.